(12) United States Patent
Qian et al.

(10) Patent No.: US 9,658,816 B2
(45) Date of Patent: May 23, 2017

(54) SYSTEM AND APPARATUS IN MANAGING COLOR-CONSISTENCY FOR MULTIPLE PANEL SIMULTANEOUS DISPLAY

(71) Applicant: SAMSUNG DISPLAY CO., LTD., Yongin, Gyeonggi-Do (KR)

(72) Inventors: Yujing Qian, Los Angeles, CA (US); Ning Lu, Saratoga, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/807,846

(22) Filed: Jul. 23, 2015

(65) Prior Publication Data

US 2016/0035072 A1 Feb. 4, 2016

Related U.S. Application Data

(60) Provisional application No. 62/030,505, filed on Jul. 29, 2014.

(51) Int. Cl.
*G06K 9/00* (2006.01)
*G06F 3/14* (2006.01)
(Continued)

(52) U.S. Cl.
CPC ......... *G06F 3/1446* (2013.01); *G06K 9/6202* (2013.01); *G09G 3/2003* (2013.01); (Continued)

(58) Field of Classification Search
CPC .... G06K 9/4652; G06K 9/6202; G06K 15/02; G06K 2009/6213; G06F 3/14; G06F 3/1423; G06F 3/1446; G06F 3/1454; G06T 5/40; G06T 7/0022; G06T 7/0077; G06T 7/408; G06T 17/00; H04N 1/4074;
(Continued)

(56) References Cited

U.S. PATENT DOCUMENTS 5,668,569 A * 9/1997 Greene .................... G09G 3/20
345/103
8,610,739 B2 * 12/2013 Lonkar ................. G06F 3/1431
345/2.1
8,704,895 B2 * 4/2014 Safaee-Rad ............. G09G 5/02
348/182

(Continued)

FOREIGN PATENT DOCUMENTS

KR 10-2014-0054719 A 5/2014

*Primary Examiner* — Jose Couso
(74) *Attorney, Agent, or Firm* — Lewis Roca Rothgerber Christie LLP (57) ABSTRACT

A system for managing color consistency in a display including a plurality of panels configured to display a source image includes: a processor; and a memory, and the memory stores instructions that, when executed by the processor, cause the processor to: select a first panel among the plurality of panels as a master panel; capture a first image of the first panel and a second image of a second panel among the plurality of panels; identify a first comparative area within the first image and a second comparative area within the second image; compare the first and second comparative areas to perform a comparison; adjust data of the source image based on the comparison, and the data is adjusted by remapping colors of the source image; and transmit the adjusted data to the second panel.

18 Claims, 5 Drawing Sheets
(5 of 5 Drawing Sheet(s) Filed in Color)

(51) Int. Cl.
*G06K 9/62* (2006.01)
*H04N 1/60* (2006.01)
*G09G 3/20* (2006.01)

(52) U.S. Cl.
CPC ....... *H04N 1/60* (2013.01); *G06K 2009/6213* (2013.01); *G09G 2300/026* (2013.01); *G09G 2320/0666* (2013.01); *G09G 2360/145* (2013.01)

(58) Field of Classification Search
CPC .......... H04N 1/60; H04N 1/6033; H04N 9/12; H04N 9/3147; H04N 9/3182; H04N 9/3194; H04N 9/67; H04N 9/69; H04N 17/02; H04N 2201/3256; G09G 3/002; G09G 3/006; G09G 3/2003; G09G 5/00; G09G 5/02; G09G 5/026; G09G 5/14; G09G 5/20; G09G 2320/0666; G09G 2320/0673; G09G 2320/0686; G09G 2320/0693; G09G 2340/06; G09G 2360/02; G09G 3/342; G09G 3/3426; G09G 2380/02; G09G 2360/145; G09G 2300/026; G01J 3/505
See application file for complete search history.

(56) References Cited

U.S. PATENT DOCUMENTS

| | | | | |
|---|---|---|---|---|
| 8,730,257 | B2 * | 5/2014 | Kyriazis | G06F 3/1431 345/545 |
| 8,836,797 | B1 * | 9/2014 | Rykowski | G09G 3/006 345/589 |
| 9,030,375 | B2 * | 5/2015 | Curtis | G06F 3/1446 345/1.1 |
| 9,135,851 | B2 * | 9/2015 | Rykowski | G09G 3/006 |
| 9,236,027 | B2 * | 1/2016 | Ishida | G09G 5/10 |
| 9,318,073 | B2 * | 4/2016 | Lonkar | G09G 5/02 |
| 9,348,553 | B2 * | 5/2016 | Curtis | G06F 3/1446 |
| 2003/0156073 | A1 * | 8/2003 | Van Zon | G06F 3/1446 345/1.1 |
| 2009/0060327 | A1 | 3/2009 | Chiang | |
| 2010/0017744 | A1 * | 1/2010 | Kikuchi | G06F 3/1446 715/781 |
| 2010/0309217 | A1 * | 12/2010 | Greenebaum | G09G 5/02 345/590 |
| 2010/0321395 | A1 * | 12/2010 | Maciesowicz | G06F 3/14 345/502 |
| 2012/0320042 | A1 * | 12/2012 | Green | G01J 3/506 345/419 |
| 2014/0035893 | A1 | 2/2014 | Jackson et al. | |

* cited by examiner

SYSTEM AND APPARATUS IN MANAGING COLOR-CONSISTENCY FOR MULTIPLE PANEL SIMULTANEOUS DISPLAY

CROSS-REFERENCE TO RELATED APPLICATION(S)

This patent application claims priority to and the benefit of U.S. Provisional Application Ser. No. 62/030,505, filed Jul. 29, 2014, titled "System And Apparatus In Managing Color-Consistency For Multiple Panel Simultaneous Display," the entire content of which is incorporated herein by reference.

FIELD

Embodiments of the present invention relate to display devices and more particularly, to managing color consistency across multiple display devices.

BACKGROUND

Multi-panel displays such as digital wall displays arrange multiple display panels within a viewer's sight at the same time. The display panels may be liquid crystal displays (LCDs), organic light emitting diode (OLED) displays, or any other suitable type of display panel. When multiple images or multiple portions of a single image are concurrently (e.g., simultaneously) displayed on multiple display panels, it is desirable that the colors of the image be displayed consistently across all of the panels. However, although colors of the image are intended to be displayed consistently across the different display panels or on projected background walls, the perceived color on different panels is often noticeably different. This may be especially problematic where, for example, a single image is desired to be displayed across multiple display panels. Thus, in order to provide a higher-quality image in a multi-panel display application, it is desirable to make the colors in different display panels visually consistent in real-time.

SUMMARY

Figure 1A:
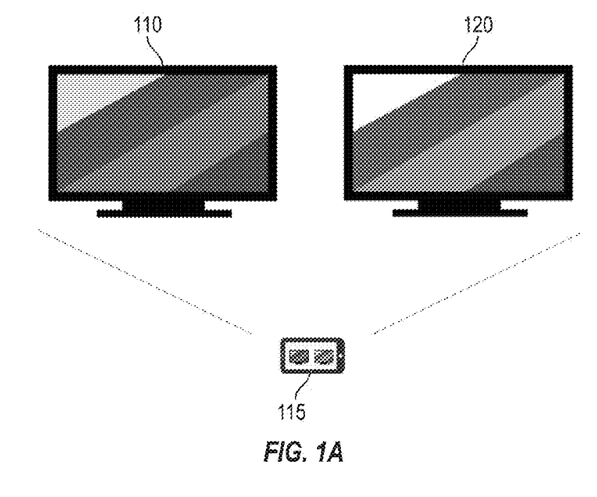
FIGS. 1A and 1B depict an example of the effect of color remapping on display panels according to an embodiment.
Figure 1B:
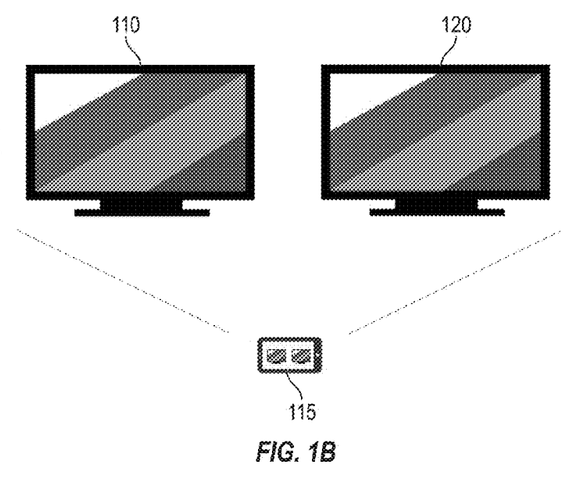

An aspect of embodiments of the present invention is directed to an approach for managing color consistency among displays by color remapping. FIGS. 1A and 1B depict an example of the effect of color remapping on display panels according to an embodiment. When comparing two panels 110 and 120 in FIG. 1A, the colors of the image displayed on panel 110 appear differently (e.g., appear darker) than the colors of the same image displayed on panel 120. A viewer such as a digital camera device 115 may be used to take a picture of the displays 110 and 120. According to an embodiment, a self-calibration and color remapping process may be performed on the source image using the picture input from the digital camera device 115. After the colors of the image are remapped, the adjusted image data is sent to the display panels. As a result, as shown in FIG. 1B, the colors of the image as displayed on panel 110 appear more consistent with the colors of the image as displayed on the panel 120.

Aspects of embodiments of the present invention provide a self-calibration and color remapping system and method using any digital camera input. For example, according to an embodiment, a system for managing color consistency across multiple panels includes a digital camera and a processor serving as the centralized color manager. The processor may be one of the display devices, or any local or remote computer, or a server over a network. The system utilizes the camera to capture images as they appear on the display panels, and the processor analyzes color disparities between the captured images. The centralized analytic system then provides each display panel (or display device) with an enhanced color remapping transformation, and cross-panel consistency can be improved by displaying the remapped image in place of the original image on the corrected display panel. The system can therefore manage the color consistency across multiple panels in concurrent (e.g., simultaneous) display.

According to an embodiment of the present invention, a system for managing color consistency in a display including a plurality of panels configured to display a source image includes: a processor; and a memory, and the memory stores instructions that, when executed by the processor, cause the processor to: select a first panel among the plurality of panels as a master panel; capture a first image of the first panel and a second image of a second panel among the plurality of panels; identify a first comparative area within the first image and a second comparative area within the second image; compare the first and second comparative areas to perform a comparison; adjust data of the source image based on the comparison, and the data is adjusted by remapping colors of the source image; and transmit the adjusted data to the second panel.

The first and second comparative areas may be identified based on a pixel to pixel correlation matching of the first and second images.

The identifying the first and second comparative areas may include identifying corners of the first and second comparative areas.

The comparing the first and second comparative areas may include comparing a first histogram corresponding to the first image with a second histogram corresponding to the image.

The first and second histograms may be color disparity histograms in which each color channel is treated independently.

The instructions, when executed, may further cause the processor to incorporate the second histogram into the first histogram after the adjusted data is transmitted to the second panel.

The instructions, when executed, may further cause the processor to generate a look-up table based on the comparison, the look-up table including parameters for the remapping the colors of the source image.

The look-up table may be generated based on a first histogram corresponding to the first image and a second histogram corresponding to the second image.

The instructions, when executed, may further cause the processor to select a third panel among the plurality of panels as the master panel.

According to another embodiment of the present invention, a method of managing color consistency in a display including a plurality of panels configured to display a source image includes: selecting, by one or more processors, a first panel among the plurality of panels as a master panel; capturing, by the one or more processors, a first image of the first panel and a second image of a second panel among the plurality of panels; identifying, by the one or more processors, a first comparative area within the first image and a second comparative area within the second image; comparing, by the one or more processors, the first and second comparative areas to perform a comparison; adjusting, by the one or more processors, data of the source image based on the comparison, and the data is adjusted by remapping colors of the source image; and transmitting, by the one or more processors, the adjusted data to the second panel.

The identifying the first and second comparative areas may include performing, by the one or more processors, a pixel to pixel correlation matching of the first and second images.

The identifying the first and second comparative areas may include identifying, by the one or more processors, corners of the first and second comparative areas.

The comparing the first and second comparative areas may include comparing, by the one or more processors, a first histogram corresponding to the first image with a second histogram corresponding to the image.

The first and second histograms may be color disparity histograms in which each color channel is treated independently.

The method may further include incorporating, by the one or more processors, the second histogram into the first histogram after the adjusted data is transmitted to the second panel.

The method may further include generating, by the one or more processors, a look-up table based on the comparison, the look-up table including parameters for the remapping the colors of the source image.

The look-up table may be generated based on a first histogram corresponding to the first image and a second histogram corresponding to the second image.

The method may further include selecting, by the one or more processors, a third panel among the plurality of panels as the master panel.

According to yet another embodiment of the present invention, a system for managing color consistency in a display including a plurality of panels configured to display a source image includes: a processor; and a memory, and the memory stores instructions that, when executed by the processor, cause the processor to: select a first panel among the plurality of panels as a master panel; capture a first image of the first panel and a second image of a second panel among the plurality of panels; identify a first comparative area within the first image and a second comparative area within the second image; compare the first and second comparative areas to perform a comparison; and adjust parameters of the second panel based on the comparison.

The parameters may include at least one of a color intensity and a gamma curve.

BRIEF DESCRIPTION OF THE DRAWINGS

The accompanying drawings, together with the specification, illustrate example embodiments of the present invention, and, together with the description, serve to explain the principles of the present invention.

The patent or application file contains at least one drawing executed in color. Copies of the patent or patent application publication with color drawing(s) will be provided by the Office upon request and payment of the necessary fee.

DETAILED DESCRIPTION

Hereinafter, example embodiments will be described in more detail with reference to the accompanying drawings, in which like reference numbers generally refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

Figure 2:
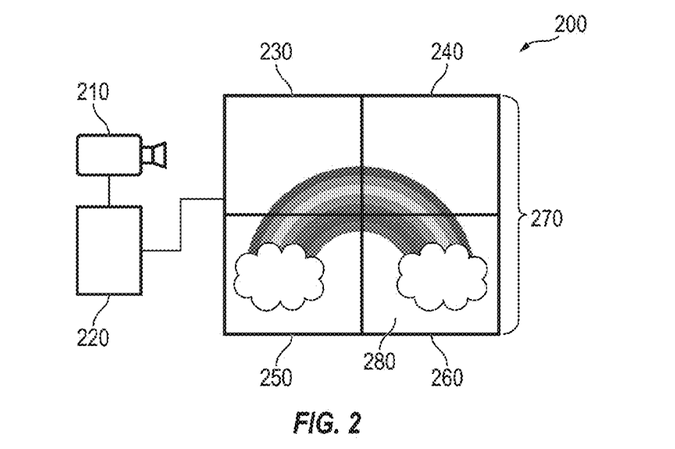
FIG. 2 is a schematic diagram of a system for managing color consistency in a multi-panel display according to an embodiment.

FIG. 2 is a schematic diagram of a system for managing color consistency in a multiple panel display according to an embodiment. The system 200 includes a camera 210 coupled to a processor 220, and display panels 230, 240, 250, and 260. The display panels 230, 240, 250 and 260 together form a multi-panel display 270 which displays a source image 280. The multi-panel display 270 is coupled to the processor 220. According to an embodiment, the processor 220 serves as a centralized color manager. The processor 220 may be located on one of the panels of the multi-panel display 270, may be located locally and combined with the camera device, or may be located separately on a remote device. For example, the processor 220 may located in the cloud.

According to an embodiment, the camera 210 is a digital camera that sees all panels 230, 240, 250, and 260 of the multi-panel display 270 and captures images of the panels. The pictures taken by the camera 210 may be used to collect information about a viewer's perception of the image (or images) displayed on the panels. The system 200 stores pixel-by-pixel information corresponding to the captured images in RGB pixel values or alternative processed forms, for example, in hue, saturation, and luminance information. The information may be stored in memory housed in the camera device and/or within the processor, or the information may be stored in a remote storage location. In an embodiment, after one set of panels is photographed, the camera 210 moves in order to photograph another set of panels of the multi-panel display 270.

In FIG. 2 the multi-panel display 270 displays a single source image 280, however embodiments of the present invention are not limited thereto, and the multi-panel display 270 may display multiple images. For example, each of the panels 230, 240, 250, and 260 may concurrently (e.g., simultaneously) display the same image repeated on each screen, or each of the panels 230, 240, 250, and 260 may concurrently (e.g., simultaneously) display different images. Additionally, the multi-panel display 270 is not limited to the configuration shown in FIG. 2. For example, the multi-panel display 270 may include any number of panels greater than two panels, arranged in any shape or form. In one embodiment, each panel image may be projected onto a surface such as a wall.

In one embodiment, the processor 220 selects one panel, such as panel 230, as a master panel. In some embodiments, the most center panel or the panel that has the largest display area may be selected as the master panel. The master panel displays an image that may serve as a reference image for the color remapping process. Color correction of the reference image may be performed based on an overall color histogram, or the reference image may be kept as is, without color correction.

After selecting a master panel (or first panel), the processor 220 selects a slave panel (or second panel) for assessment. In one embodiment, the slave panel may be the panel having the largest overlap region with the master panel or the longest common edge with the master panel.

Figure 3:
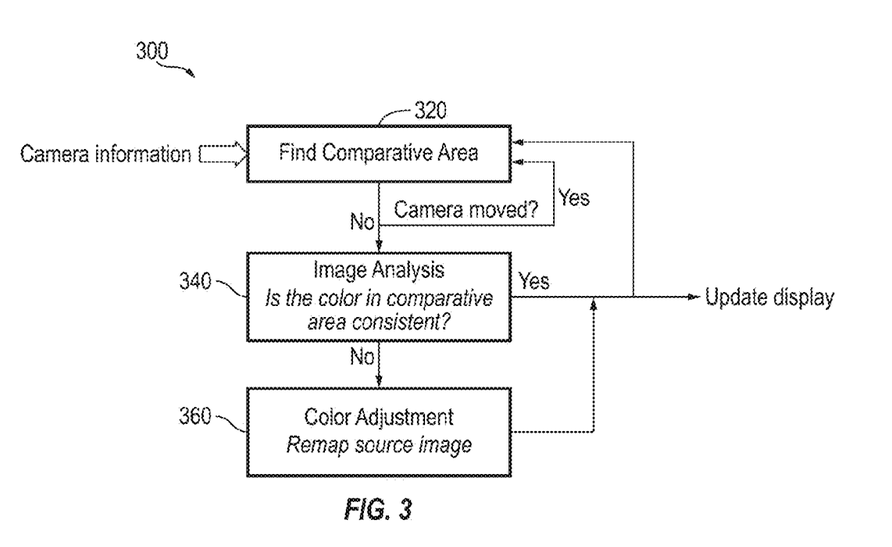
FIG. 3 is a flow diagram of a process for managing color consistency in a multi-panel display according to an embodiment.

FIG. 3 is a flow diagram of a process 300 for managing color consistency in a multi-panel display according to an embodiment.

In one embodiment, the process 300 is performed by the processor 220 and is applied to the master panel and the slave panel selected by the processor 220, using information from pictures of the panels captured (or taken) by the camera 210. The camera 210 may capture a picture (or first image) of the master panel and a picture (or second image) of the slave panel. As shown in FIGS. 1A and 1B, the camera may also take just one picture that includes both the master and slave panels (e.g., one picture depicting both the first image and the second image). At box 320, the process identifies (or finds) comparative image areas of the master panel and the slave panel in the captured pictures.

If camera movement is detected, for example when the camera moves to capture a new picture, the process identifies a comparative area of the newly captured image. If camera movement is not detected, then the comparative areas of the master panel image and the slave panel image are analyzed to determine if colors within the comparative areas are visually consistent with each other. That is, colors in the slave panel comparative image area are compared with colors in the master panel comparative image area. In one embodiment, the process may utilize a threshold such that when the peak signal-to-noise-ratio (PSNR) of the slave panel comparative area is within an acceptable margin of the PSNR of the master panel comparative area, the process determines that the colors are visually consistent. If the colors are determined to be visually consistent, the process returns to box 320 and identifies another comparative area corresponding to another slave panel (or third panel).

If the colors are determined to be not visually consistent, a color remapping process is performed at box 360 to remap the colors of the source image 280. The adjusted image data is then transmitted (or sent) to the slave panel to be corrected. When the slave panel displays the remapped source image, the colors appearing on the slave panel are more visually consistent with the colors appearing on the master panel. The process 300 returns to box 320 and identifies another comparative area corresponding to another slave panel, and the process continues until it extends to all participating panels. As such, the process 300 includes a self-calibration loop to manage the consistency of colors captured by the camera 210, by comparing selected comparative image areas.

Referring again to FIG. 2, in one embodiment, the camera 210 takes pictures of the panels 230, 240, 250, and 260. The processor 220 receives information from the camera 210 and selects a master panel and a slave panel from among the panels 230, 240, 250, and 260. For example, the processor 220 may select panel 230 as the master panel and panel 240 as the slave panel. The processor 220 identifies comparative image areas of panels 230 and 240 using the pictures taken by the camera 210. If the colors of the comparative image area of panel 240 (the slave panel) are determined to be not visually consistent with the colors of the comparative image area of panel 230 (the master panel), the processor 220 remaps the colors of the source image 280 and transmits the adjusted (e.g., remapped) source image data to the panel 240. The panel 240 then displays a remapped image having colors that appear more visually consistent with the colors appearing on the panel 230.

Next, the camera 210 may move to capture a picture of another slave panel such as panel 250. The processor 220 utilizes the picture to identify and compare comparative image areas of the panel 250 and the current master panel, panel 230, to determine whether the perceived colors of the panel 250 are visually consistent with the perceived colors of the panel 230. If the colors displayed by the panel 250 are not visually consistent with the colors displayed by the panel 230, the processor 220 again remaps the colors of the source image and transmits the adjusted (or remapped) image data to the current slave panel, panel 250. The panel 250 then displays a remapped image having colors that appear more visually consistent with the colors appearing on the panel 230. The camera 210 may then move to capture a picture of another slave panel (e.g., panel 260), and processor 220 repeats the above process. In another embodiment, rather than capturing new images between assessments of comparative image areas, the camera 210 may capture a picture (or pictures) of several or all panels at once, and the processor 220 may store the captured images until it is time for assessment of the images. The processor 220 may retrieve each captured image at the time of its comparison with the master panel image.

Any number of suitable methods may be used to identify comparative image areas as described in box 320 of FIG. 3. For example, in one embodiment, programming functions such as Open Source Computer Vision (OpenCV) image feature finding functions are used to identify and scale comparative areas (or comparative regions). Scaling (e.g., rescaling) may be useful when a source image is concurrently (e.g., simultaneously) displayed on two display panels of different sizes, resulting in the source image's physical dimensions being different on each display panel.

Figure 4A:
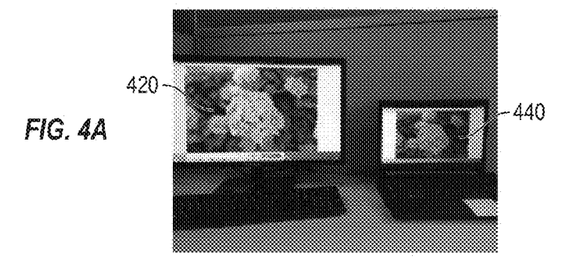
FIGS. 4A to 4D depict a process of identifying comparative image areas according to an embodiment.
Figure 4B:
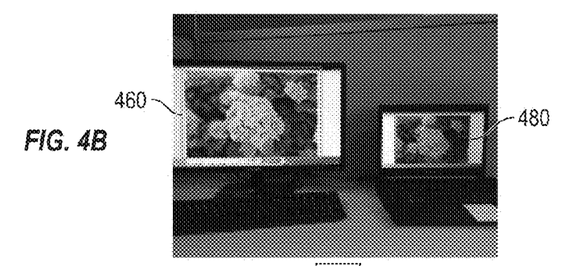
Figure 4C:
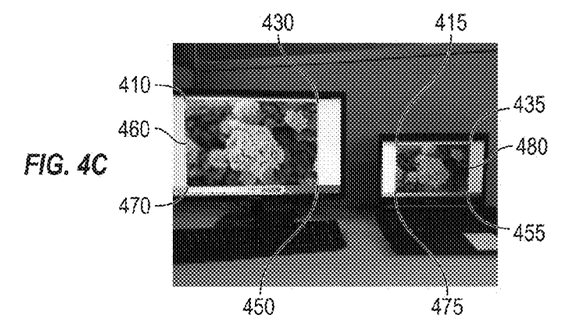

FIGS. 4A to 4C depict a picture taken by a camera of two display panels. In one embodiment, the process 300 performs a template matching to identify comparative image areas of the images 420 and 440. For example, the processor 220 may use the master panel image 420 to identify a comparative area of the slave panel image 440. According to an embodiment, template matching is performed by conducting a pixel to pixel correlation matching between the images 420 and 440 using Equation (1), and the best match area is returned.

$$R(x, y) = \frac{\sum_{x',y'} (T(x', y') - I(x+x', y+y'))^2}{\sqrt{\sum_{x',y'} T(x+y')^2 \sum_{x',y'} I(x+x', y+y')^2}} \quad (1)$$

In Equation (1), the variable I represents the image 440 in FIG. 4A and the coordinates (x,y) represent a point of interest in the image 440. The variable T represents an image piece (which may be referred to as a "template") in the image 420 that corresponds to an image piece in the image 440 near the coordinates (x,y). Equation (1) calculates the normalized error for the image piece T and the image piece from the image 440, where the coordinates (x',y') represent each point in the image piece T. After the comparative image areas have been identified and scaled, the process 300 returns the coordinates of boundary points of the comparative areas 460 and 480 in FIG. 4B. The comparative areas may have any suitable shape, such as a rectangular or a circular shape.

In an embodiment, the process 300 next identifies corners of the comparative image area 480 and corners of the comparative image area 460. For example, as shown in FIG. 4C, the four corners 410, 430, 450, and 470 of the comparative image area 460 are identified and the four corners 415, 435, 455, and 475 of the comparative image area 480 are identified using a process such as line detection.

In one embodiment, the identified corners are used to calculate a projection matrix, and the two images are then recovered. That is, the four points corresponding to the four corners of each comparative area are sufficient to estimate the plane projection matrix in homogeneous coordinates according to Equation (2):

$$\begin{pmatrix} x' \\ y' \\ 1 \end{pmatrix} = H \begin{pmatrix} x \\ y \\ 1 \end{pmatrix} \text{ where } H = \begin{pmatrix} h11 & h12 & h13 \\ h21 & h22 & h23 \\ h31 & h32 & h33 \end{pmatrix} \quad (2)$$

Figure 4D:
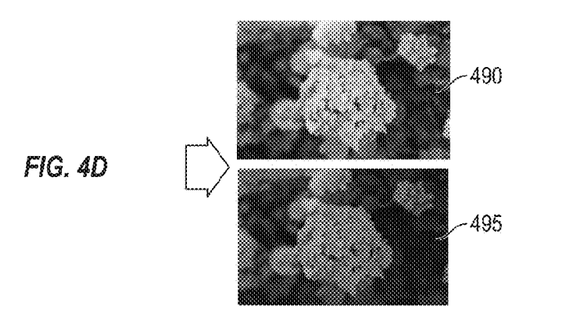

The inverse function $H^{-1}$ can then be used to recover each image. FIG. 4D shows an example of the recovered image 490, which corresponds to the image 420, and the recovered image 495, which corresponds to the image 440.

Accordingly, the process 300 can identify and scale comparative areas, and can determine boundary points of the comparative areas. However, embodiments of the present invention are not limited to the above-described process for finding the comparative areas. For example, when there are only limited system resources available to find the comparative areas, only the step of template matching may be performed, and one or both of the steps of identifying the corners (e.g., using line detection) and using the corners to calculate a projection matrix may be omitted.

Figure 5A:
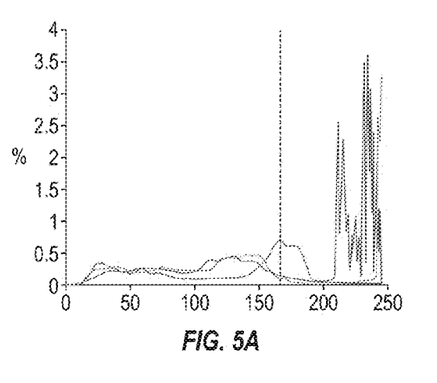
FIGS. 5A and 5B are color distribution histograms of images shown in FIGS. 5C and 5D, respectively, according to an embodiment.
Figure 5B:
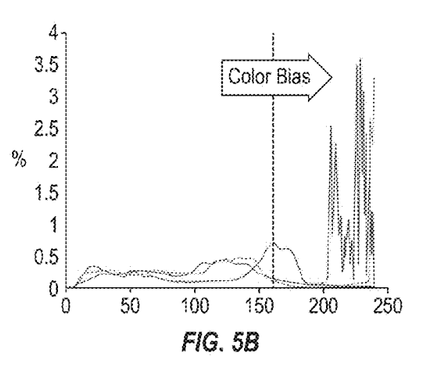
Figure 5C:
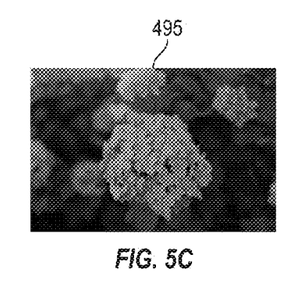
FIGS. 5E and 5F are color disparity histograms according to an embodiment.
Figure 5D:
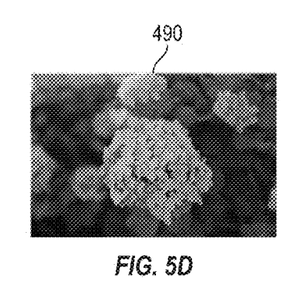

After the comparative areas have been identified, as described in box 340 of FIG. 3, the process 300 analyzes the comparative areas for visual consistency. In one embodiment, the process 300 scans the comparative areas to extract and compare selected pixel pairs of corresponding points. As shown in FIGS. 5A to 5F, in another embodiment, instead of individual RGB pixels, the process 300 utilizes histograms to analyze the comparative areas. FIG. 5A is a color distribution histogram of the image 495 shown in FIG. 5C. FIG. 5B is a color distribution histogram of the image 490 shown in FIG. 5D. According to an embodiment, the histogram in FIG. 5A corresponds to the master panel and the histogram in FIG. 5B corresponds to the slave panel.

According to an aspect of an embodiment of the present invention, instead of following the overall color histogram, the process 300 treats each individual color channel independently. The color distribution histograms in FIGS. 5A and 5B depict the distribution of red, green and blue colors in the images 495 and 490, respectively. For example, the color distribution histogram in FIG. 5A shows the percentage of pixels at each of 256 brightness levels for the colors red, green, and blue in the master panel image 495. The color distribution histogram in FIG. 5B shows the percentage of pixels at each of 256 brightness levels for the colors red, green, and blue in the slave panel image 490. When the colors are calibrated differently, global color changes may be referred to as "shift." As shown in FIGS. 5A and 5B, while the images 495 and 490 are both biased toward higher-brightness pixel distribution, the histogram of FIG. 5A is shifted more to the right when compared with the histogram of FIG. 5B. According to an embodiment, the histogram data of FIGS. 5A and 5B are respectively summed up using Equation (3), to create the color disparity histograms in FIGS. 5E and 5F, respectively.

$$X_i^c = \frac{\sum_{P_{(x,y)}^c < i, P_{(x,y)} \in P1}}{\sum_{P_{(x,y)} \in P1}} \quad (3)$$

Equation (3) assumes that the color distortion is monotonous, that is, that each individual color channel is treated independently. In Equation (3), the variable p represents the picture, the variable c refers to the colors of red, green or blue, the variable i represents the pixel values (e.g., the vertical axis in FIGS. 5E and 5F), and the variable x represents a percentage of pixels (e.g., the horizontal axis in FIGS. 5E and 5F).

Figure 5E:
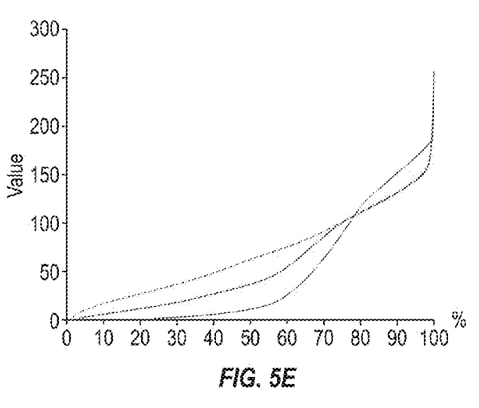
Figure 5F:
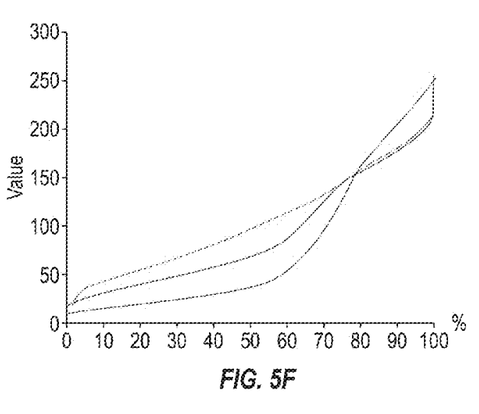

FIG. 5E is a color disparity histogram (or first histogram) resulting from summation of the histogram data in FIG. 5A according to Equation (3). FIG. 5F is a color disparity histogram (or second histogram) resulting from summation of the histogram data in FIG. 5B according to Equation (3).

According to an embodiment, as described in box 360 of FIG. 3, color adjustment (e.g., a color remapping process) is performed on the source image based on the above-described image analysis. In one embodiment, a look-up table is generated based on the color disparity histograms, and color remapping of the source image data is performed using the data in the look-up table. For example, in one embodiment, the function Hm[p]=V applies to the master panel color disparity histogram of FIG. 5E and defines the percentage p of pixel values that are below or equal to a pixel value V. The function Hs[q]=X applies to the slave panel color disparity histogram of FIG. 5F and defines the percentage q of pixel values that are below or equal to pixel value X. The color remapping function is defined as Hm[Hs$^{-1}$[x]], which can be calculated once for all pixel values x=0, 1, 2, . . . 255. Thus, according to an embodiment, the process 300 utilizes the color remapping function to generate the look-up table for color remapping. After color remapping is performed on the source image data, the processor 220 transmits the adjusted source image data to the slave panel, and the slave panel displays the remapped image. In one embodiment, after color correction has been performed on the slave panel, the histogram of the corrected slave panel is incorporated into the histogram of the master panel.

Figure 6A:
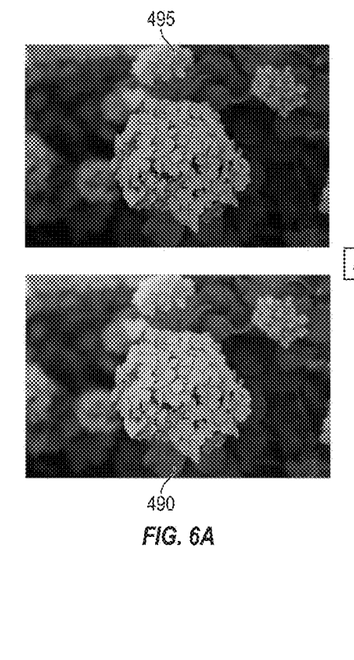
FIGS. 6A and 6B depict images before and after a color remapping process according to an embodiment.
Figure 6B:
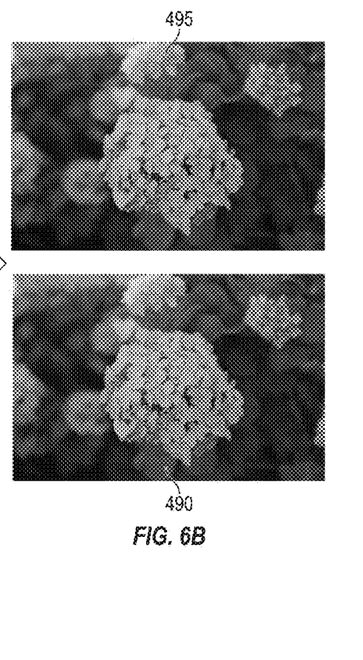

FIGS. 6A and 6B depict the images 490 and 495 before and after color remapping. As shown, before color remapping is applied, the colors in the image 495 appear differently (e.g., appear darker) than the colors in the image 490. After the source image data is remapped, the colors in the image 495 appear more visually consistent with the colors in the image 490.

Figure 7A:
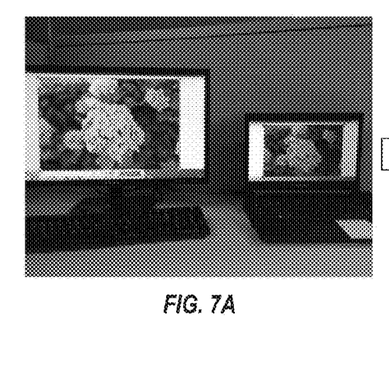
FIGS. 7A and 7B depict display panels before and after a color remapping process according to an embodiment.
Figure 7B:
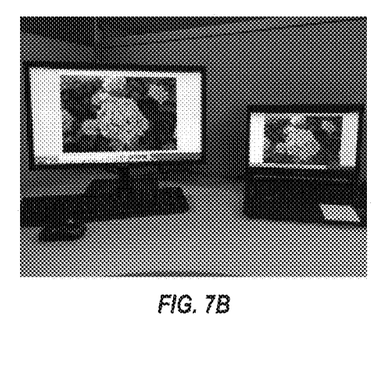

FIGS. 7A and 7B depict two display panels before and after color remapping. As shown in FIG. 7A, before color remapping is applied, the colors shown on the left-hand panel appear differently (e.g., appear darker) than the colors shown on the right-hand panel. After the source image data is remapped, as shown in FIG. 7B, the colors shown on the panels appear more visually consistent with each other.

It will be understood that, although the terms "first," "second," "third," etc., may be used herein to describe various elements, components, regions, layers and/or sections, these elements, components, regions, layers and/or section's should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Expressions such as "at least one of," when preceding a list of elements, modify the entire list of elements and do not modify the individual elements of the list. Further, the use of "may" when describing embodiments of the present invention refers to "one or more embodiments of the present invention."

The system for managing color consistency and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the system may be formed on one integrated circuit (IC) chip or on separate IC chips. Further, the various components of the system may be implemented on a flexible printed circuit film, a tape carrier package (TCP), a printed circuit board (PCB), or formed on a same substrate. Further, the various components of the system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While certain embodiments of the present invention have been illustrated and described, it is understood by those of ordinary skill in the art that certain modifications and changes can be made to the described embodiments without departing from the spirit and scope of the present invention as defined by the following claims, and equivalents thereof.

For example, in some embodiments, display panels may be synchronized using initialization images (e.g., pre-defined images or testing images) having well-known grids and geometries, and specific color and frequency patterns. The initialization images may be launched as an additional initialization step in the process 300 for better calibration. For example, initialization images may be used to perform a color correction on the reference image displayed on the master panel. Initialization images having known geometry patterns and color palettes may be used to identify comparative areas in the images.

Additionally, embodiments of the present invention may be applied to the YUV color space or the LHS (luminance, hue, and saturation) color space, instead of applied to the RGB color space.

Moreover, instead of providing look-up parameters for color remapping, parameters such as a display panel's color intensity and/or gamma curve could be directly controlled and adjusted to manage color consistency between panels. Additionally, instead of calibrating panels against each other, the process may adjust panels iteratively by alternating the master (or fixed) panel. In one embodiment, the master panel is the panel having the most neutral color histogram, or the panel closest to some ground truth criteria of the testing images.

In some embodiments, the system may intercept the display image data either in the system after the graphics processing unit (GPU) and right before transmitting (or sending) the data to the display panels, or in the display panel right after receiving the input display data.

According to embodiments of the present invention, an iterative process of managing color consistency in a multi-panel display may be performed incrementally, providing smaller correction within each iteration, for the least amount of disruption to display processing.

What is claimed is:

1. A system for managing color consistency in a display comprising a plurality of panels configured to display at least one source image, the system comprising:
   a processor; and
   a memory, wherein the memory stores instructions that, when executed by the processor, cause the processor to:
      select a first panel from among the plurality of panels as a master panel, the master panel being configured to display at least a portion of the at least one source image;
      capture a first image of the first panel and a second image of a second panel from among the plurality of panels;
      identify a first comparative area within the first image and a second comparative area within the second image;
      compare the first and second comparative areas to perform a comparison;
      adjust data of the source image based on the comparison, wherein the data is adjusted by remapping colors of the source image;
      transmit the adjusted data to the second panel; and
      generate a look-up table based on the comparison, the look-up table comprising parameters for the remapping the colors of the source image.

2. The system of claim 1, wherein the first and second comparative areas are identified based on a pixel to pixel correlation matching of the first and second images.

3. The system of claim 1, wherein the identifying the first and second comparative areas comprises identifying corners of the first and second comparative areas.

4. The system of claim 1, wherein the comparing the first and second comparative areas comprises comparing a first histogram corresponding to the first image with a second histogram corresponding to the image.

5. The system of claim 4, wherein the first and second histograms are color disparity histograms in which each color channel is treated independently.

6. The system of claim 5, wherein the instructions, when executed, further cause the processor to incorporate the second histogram into the first histogram after the adjusted data is transmitted to the second panel.

7. The system of claim 1, wherein the look-up table is generated based on a first histogram corresponding to the first image and a second histogram corresponding to the second image.

8. The system of claim 1, wherein the instructions, when executed, further cause the processor to select a third panel among the plurality of panels as the master panel.

9. A method of managing color consistency in a display comprising a plurality of panels configured to display at least one source image, method system comprising:
   selecting, by one or more processors, a first panel from among the plurality of panels as a master panel, the master panel being configured to display at least a portion of the at least one source image;
   capturing, by the one or more processors, a first image of the first panel and a second image of a second panel from among the plurality of panels;
   identifying, by the one or more processors, a first comparative area within the first image and a second comparative area within the second image;
   comparing, by the one or more processors, the first and second comparative areas to perform a comparison;
   adjusting, by the one or more processors, data of the source image based on the comparison, wherein the data is adjusted by remapping colors of the source image; and
   transmitting, by the one or more processors, the adjusted data to the second panel,
   wherein the comparing the first and second comparative areas comprises comparing, by the one or more processors, a first histogram corresponding to the first image with a second histogram corresponding to the image.

10. The method of claim 9, wherein the identifying the first and second comparative areas comprises performing, by the one or more processors, a pixel to pixel correlation matching of the first and second images.

11. The method of claim 9, wherein the identifying the first and second comparative areas comprises identifying, by the one or more processors, corners of the first and second comparative areas.

12. The method of claim 9, wherein the first and second histograms are color disparity histograms in which each color channel is treated independently.

13. The method of claim 12, further comprising incorporating, by the one or more processors, the second histogram into the first histogram after the adjusted data is transmitted to the second panel.

14. The method of claim 9, further comprising generating, by the one or more processors, a look-up table based on the comparison, the look-up table comprising parameters for the remapping the colors of the source image.

15. The method of claim 14, wherein the look-up table is generated based on a first histogram corresponding to the first image and a second histogram corresponding to the second image.

16. The method of claim 9, further comprising selecting, by the one or more processors, a third panel among the plurality of panels as the master panel.

17. A system for managing color consistency in a display comprising a plurality of panels configured to display at least one source image, the system comprising:
   a processor; and
   a memory, wherein the memory stores instructions that, when executed by the processor, cause the processor to:

select a first panel from among the plurality of panels as a master panel, the master panel being configured to display at least a portion of the at least one source image;
capture a first image of the first panel and a second image of a second panel from among the plurality of panels;
identify a first comparative area within the first image and a second comparative area within the second image;
compare the first and second comparative areas to perform a comparison; and
adjust parameters of the second panel based on the comparison,
wherein the comparing the first and second comparative areas comprises comparing a first histogram corresponding to the first image with a second histogram corresponding to the image.

18. The system of claim 17, wherein the parameters comprise at least one of a color intensity and a gamma curve.

\* \* \* \* \*